(12) United States Patent
Tan et al.

(10) Patent No.: US 11,960,924 B2
(45) Date of Patent: Apr. 16, 2024

(54) INTER-THREAD INTERRUPT SIGNAL SENDING BASED ON INTERRUPT CONFIGURATION INFORMATION OF A PCI DEVICE AND THREAD STATUS INFORMATION

(71) Applicant: Alipay (Hangzhou) Information Technology Co., Ltd., Zhejiang (CN)

(72) Inventors: Jianfeng Tan, Zhejiang (CN); Tiwei Bie, Zhejiang (CN); Jielong Zhou, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/353,020

(22) Filed: Jul. 14, 2023

(65) Prior Publication Data
US 2023/0359484 A1    Nov. 9, 2023

Related U.S. Application Data

(63) Continuation of application No. PCT/CN2022/116160, filed on Aug. 31, 2022.

(30) Foreign Application Priority Data

Nov. 1, 2021    (CN) .......................... 202111282442.6

(51) Int. Cl.
*G06F 9/48*    (2006.01)
(52) U.S. Cl.
CPC .......... *G06F 9/4825* (2013.01); *G06F 9/4812* (2013.01)

(58) Field of Classification Search
CPC ......... G06F 9/4825; G06F 9/4812; G06F 9/48
See application file for complete search history.

(56) References Cited

U.S. PATENT DOCUMENTS 7,243,178 B2 *    7/2007    Munguia ................. G06F 13/28
                                                        710/266
10,599,481 B2 *    3/2020    Pistol ...................... G06F 1/324
(Continued)

FOREIGN PATENT DOCUMENTS

CN    101159765 A    4/2008
CN    108196946 A    6/2018
(Continued)

*Primary Examiner* — Michael W Ayers
(74) *Attorney, Agent, or Firm* — Seed IP Law Group LLP (57) ABSTRACT

Implementations of the present specification provide an inter-thread interrupt signal sending method and apparatus. In the inter-thread interrupt signal sending method, a processor in which a first thread is located sends a notification message to a PCI device via a PCI bus by using an MMIO write operation. The MMIO write operation is implemented based on a virtual space address of the first thread to which a memory address of an MMIO memory of the PCI device is mapped. The PCI device generates an interrupt signal for a second thread in response to receiving the notification message, and sends the interrupt signal to a processor in which the second thread is located based on an interrupt signal sending manner configured in interrupt configuration information of the PCI device. The interrupt configuration information of the PCI device is pre-configured based on status information of the second thread, and the status information of the second thread includes whether the second thread is running or a running status of the second thread.

20 Claims, 4 Drawing Sheets

(56) References Cited

U.S. PATENT DOCUMENTS

| | | | |
|---|---|---|---|
| 2008/0028403 A1* | 1/2008 | Hoover | G06T 15/50 |
| | | | 718/100 |
| 2008/0104296 A1 | 5/2008 | Blackmore et al. | |
| 2009/0006074 A1* | 1/2009 | Green | G06F 9/45504 |
| | | | 703/28 |
| 2009/0006791 A1* | 1/2009 | Clark | G06F 9/30032 |
| | | | 712/E9.034 |
| 2009/0007124 A1* | 1/2009 | Guo | G06F 12/0253 |
| | | | 718/103 |
| 2011/0145462 A1* | 6/2011 | Mukherjee | G06F 9/4812 |
| | | | 710/269 |
| 2012/0054750 A1* | 3/2012 | Saripalli | G06F 9/5094 |
| | | | 718/100 |
| 2014/0223059 A1* | 8/2014 | Marietta | G06F 9/4812 |
| | | | 710/261 |
| 2014/0304709 A1* | 10/2014 | Chandhoke | G06F 9/4825 |
| | | | 718/102 |
| 2016/0179518 A1* | 6/2016 | Arimilli | G06F 13/4022 |
| | | | 712/225 |
| 2016/0224362 A1* | 8/2016 | Tsirkin | G06F 9/45558 |
| 2017/0255576 A1* | 9/2017 | Avudaiyappan | G06F 13/26 |
| 2018/0046536 A1* | 2/2018 | Iyigun | G06F 11/0712 |
| 2018/0095517 A1* | 4/2018 | Sagar | G06F 9/485 |
| 2023/0205713 A1* | 6/2023 | Jiang | G06F 9/50 |
| | | | 710/260 |

FOREIGN PATENT DOCUMENTS

| | | |
|---|---|---|
| CN | 109144679 A | 1/2019 |
| CN | 112783600 A | 5/2021 |
| CN | 114003363 A | 2/2022 |

\* cited by examiner

INTER-THREAD INTERRUPT SIGNAL SENDING BASED ON INTERRUPT CONFIGURATION INFORMATION OF A PCI DEVICE AND THREAD STATUS INFORMATION

TECHNICAL FIELD

Implementations of the present specification generally relate to the field of computer technologies, and in particular, to an inter-thread interrupt signal sending method and apparatus.

BACKGROUND

Interrupts of a multi-core multi-thread processor can be centrally controlled by a programmable interrupt controller (PIC). The PIC allows a hardware thread to interrupt another hardware thread. This method is referred to as an inter-processor interrupt (IPI). The PIC has an inter-processor interrupt register IPIBase with a width of 32 bits. The register stores content such as a number of a destination thread, an interrupt vector, and an interrupt type (whether to interrupt a plurality of hardware threads). The inter-processor interrupt can be generated by writing a target value to the inter-processor interrupt register IPIBase. If a hardware thread A wants to send an inter-processor interrupt to a hardware thread B, the hardware thread A only needs to write values such as a thread ID, an interrupt vector, and an interrupt type, of the hardware thread B to the inter-processor interrupt register IPIBase. The PIC notifies a kernel in which the hardware thread B is located to suspend a current execution sequence of the kernel and jump to an entry of an interrupt service routine (ISR) based on the interrupt vector.

In a Host Kernel, a CPU can implement interrupt signal sending between hardware threads by using an IPI. However, in some application scenarios, interrupt signal sending between hardware threads cannot be implemented by using an IPI.

SUMMARY

Implementations of the present specification provide an inter-thread interrupt signal sending method and apparatus. According to inter-thread interrupt signal sending method and apparatus, interrupt signal sending between all threads in a running state can be implemented.

According to an aspect of the implementations of the present specification, a method for sending an interrupt signal between a first thread and a second thread is provided. The method is performed by a PCI device and the method includes: receiving, via a PCI bus, a notification message sent by a processor in which a first thread is located by using an MMIO write operation, where the MMIO write operation is implemented based on a virtual space address of the first thread to which a memory address of an MMIO memory of the PCI device is mapped; generating an interrupt signal for a second thread in response to receiving the notification message; and sending the interrupt signal to a processor in which the second thread is located based on an interrupt signal sending manner configured in interrupt configuration information of the PCI device, where the interrupt configuration information is configured based on status information of the second thread, and the status information of the second thread includes whether the second thread is running or a running status of the second thread.

In an example, that the interrupt configuration information is configured based on the status information of the second thread can include: configuring the interrupt signal sending manner as sending the interrupt signal to an interrupt handler configured for the second thread in the processor in which the second thread is located based on the second thread is in a Host Kernel; configuring an interrupt as a Posted Interrupt, and configuring the interrupt signal sending manner as sending the interrupt signal to the processor in which the second thread is located based on the second thread is in a Guest Kernel and the second thread is running; configuring the interrupt signal sending manner as sending the interrupt signal to a physical processor corresponding to a virtual processor in which the second thread is located in the Host Kernel based on the second thread is in the Guest Kernel and the second thread is not running, where the physical processor is configured to wake up the virtual processor in which the second thread is located; or configuring the interrupt signal sending manner as sending the interrupt signal to the processor in which the second thread is located based on the second thread is in a user mode.

In an example, the configuring the interrupt signal sending manner as sending the interrupt signal to the processor in which the second thread is located based on the second thread is in the user mode can include: configuring the interrupt signal sending manner as sending the interrupt signal to the processor in which the second thread is located by using a semaphore sending method or an eventfd sending method based on the second thread is in the user mode.

In an example, the notification message includes a mov instruction, a source operand of the mov instruction stores a target value of the MMIO memory of the PCI device, and a destination address of the mov instruction is the virtual space address of the first thread to which the MMIO memory is mapped.

In an example, the target value of the MMIO memory includes one of a plurality of values, and each value of the plurality of values corresponds to a type of an interrupt signal. Correspondingly, the generating the interrupt signal in response to receiving the notification message can include: generating the interrupt signal corresponding to the target value based on the target value of the MMIO memory in the mov instruction in response to receiving the mov instruction.

In an example, the MMIO memory includes a doorbell memory.

In an example, the PCI device has a restriction policy, and the method can further include: performing restriction determining according to the restriction policy after generating the interrupt signal. The interrupt signal is not sent in response to a result of the restriction determining is that restriction is to be performed; and the interrupt signal is sent to the processor in which the second thread is located based on the interrupt signal sending manner configured in the interrupt configuration information of the PCI device in response to a result of the restriction determining is that restriction is not to be performed.

In an example, the PCI device has a distribution policy. The sending the interrupt signal to the processor in which the second thread is located based on the interrupt signal sending manner configured in the interrupt configuration information of the PCI device can include: sending the interrupt signal to the processor in which the second thread is located based on the interrupt signal sending manner configured in the interrupt configuration information of the PCI device according to the distribution policy in the PCI device.

In an example, the PCI device has an interrupt remapping table. The method can further include: performing interrupt remapping on the interrupt signal based on the interrupt remapping table. Correspondingly, the sending the interrupt signal to the processor in which the second thread is located based on the interrupt signal sending manner configured in the interrupt configuration information of the PCI device can include: sending an interrupt signal obtained after the interrupt remapping to the processor in which the second thread is located based on the interrupt signal sending manner configured in the interrupt configuration information of the PCI device.

According to an aspect of the implementations of the present specification, an apparatus for sending an interrupt signal between a first thread and a second thread is provided. The apparatus is applied to a PCI device and the apparatus includes: a notification receiving unit, configured to receive, via a PCI bus, a notification message sent by a processor in which a first thread is located by using an MMIO write operation, where the MMIO write operation is implemented based on a virtual space address of the first thread to which a memory address of an MMIO memory of the PCI device is mapped; an interrupt signal generation unit, configured to generate an interrupt signal for a second thread in response to receiving the notification message; an interrupt configuration information configuration unit, configured to configure interrupt configuration information of the PCI device based on status information of the second thread, where the status information of the second thread includes whether the second thread is running or a running status of the second thread; and an interrupt signal sending unit, configured to send the interrupt signal to a processor in which the second thread is located based on an interrupt signal sending manner configured in the interrupt configuration information of the PCI device.

In an example, the interrupt configuration information configuration unit is configured to configure the interrupt signal sending manner as sending the interrupt signal to an interrupt handler configured for the second thread in the processor in which the second thread is located based on the second thread is in a Host Kernel; the interrupt configuration information configuration unit is configured to configure an interrupt as a Posted Interrupt, and configure the interrupt signal sending manner as sending the interrupt signal to the processor in which the second thread is located based on the second thread is in a Guest Kernel and the second thread is running; the interrupt configuration information configuration unit is configured to configure the interrupt signal sending manner as sending the interrupt signal to a physical processor corresponding to a virtual processor in which the second thread is located in the Host Kernel based on the second thread is in the Guest Kernel and the second thread is not running, where the physical processor is configured to wake up the virtual processor in which the second thread is located; or the interrupt configuration information configuration unit is configured to configure the interrupt signal sending manner as sending the interrupt signal to the processor in which the second thread is located based on the second thread is in a user mode.

In an example, the interrupt configuration information configuration unit is configured to configure the interrupt signal sending manner as sending the interrupt signal to the processor in which the second thread is located by using a semaphore sending method or an eventfd sending method based on the second thread is in the user mode.

In an example, the notification message includes a mov instruction, a source operand of the mov instruction stores a target value of the MMIO memory of the PCI device, and a destination address of the mov instruction is the virtual space address of the first thread to which the MMIO memory is mapped.

In an example, the target value of the MMIO memory includes one of a plurality of values, and each value of the plurality of values corresponds to a type of an interrupt signal. Correspondingly, the interrupt signal generation unit is configured to generate the interrupt signal corresponding to the target value based on the target value of the MMIO memory in the mov instruction in response to receiving the mov instruction.

In an example, the PCI device has a restriction policy. The apparatus can further include: a restriction determining unit, configured to perform restriction determining according to the restriction policy after the interrupt signal is generated. The interrupt signal sending unit does not send the interrupt signal in response to that the restriction determining unit determines that restriction is to be performed; or the interrupt signal sending unit sends the interrupt signal to the processor in which the second thread is located based on the interrupt signal sending manner configured in the interrupt configuration information of the PCI device in response to that the restriction determining unit determines that restriction is not to be performed.

In an example, the PCI device has a distribution policy. The interrupt signal sending unit is configured to send the interrupt signal to the processor in which the second thread is located based on the interrupt signal sending manner configured in the interrupt configuration information of the PCI device according to the distribution policy.

In an example, the PCI device has an interrupt remapping table. The apparatus can further include: an interrupt remapping unit, configured to perform interrupt remapping on the interrupt signal based on the interrupt remapping table. The interrupt signal sending unit is configured to send an interrupt signal obtained after the interrupt remapping to the processor in which the second thread is located based on the interrupt signal sending manner configured in the interrupt configuration information of the PCI device.

According to an aspect of the implementations of the present specification, an apparatus for sending an interrupt signal between a first thread and a second thread is provided. The apparatus includes: at least one processor; a storage coupled to the at least one processor; and a computer program stored in the storage, where the at least one processor executes the computer program to implement the method for sending an interrupt signal between a first thread and a second thread described above.

According to an aspect of the implementations of the present specification, a computer-readable storage medium is provided, storing a computer program, where the computer program is executed by a processor to implement the method for sending an interrupt signal between a first thread and a second thread described above.

According to an aspect of the implementations of the present specification, a computer program product is provided, including a computer program, where the computer program is executed by a processor to implement the method for sending an interrupt signal between a first thread and a second thread described above.

BRIEF DESCRIPTION OF DRAWINGS

The technical features, implementations, and technical benefits of the present specification can be further understood with reference to the following accompanying drawings. In the accompanying drawings, similar components or features can have the same reference numeral.

DESCRIPTION OF IMPLEMENTATIONS

The subject matter described herein will now be discussed with reference to example implementations. It should be understood that the discussion of these implementations is merely to enable a person skilled in the art to better understand and thereby achieve the subject matter described herein, and is not intended to limit the protection scope, applicability, or examples of the specification. The function and arrangement of discussed elements can be changed without departing from the protection scope of the content of the present specification. In the examples, various processes or components can be omitted, replaced, or added as required. For example, the described method can be performed in a different order from the described order, and various steps can be added, omitted, or combined. In addition, features described with respect to some examples can be combined with features in other examples.

As used herein, the term "include" and a variation thereof are open-ended terms, and mean "including but not limited to". The term "based on" represents "at least partially based on". The terms "one implementation" and "an implementation" represent "at least one implementation". The term "another implementation" represents "at least one other implementation". The terms "first", "second", and the like can represent different or same objects. Other explicit or implicit definitions can be included below. Unless the context clearly indicates otherwise, the definition of a term is consistent throughout the specification.

In a Host Kernel, a CPU can implement interrupt signal sending between hardware threads by using an IPI. However, in some application scenarios, for a permission reason, interrupt signal notification between CPUs in which threads are located cannot be implemented by using an IPI mechanism. Examples of such application scenarios can include a virtual Central Processing Unit (vCPU) synchronization operation, a para-virtualized (PV) driver, and a two-level scheduler.

In an application scenario of the vCPU synchronization operation, a thread "Sender" used as an interrupt signal sender is in a Guest Kernel, and a thread "Receiver" used as an interrupt signal receiver is in the Guest Kernel. In a hardware virtualization background, the vCPU synchronization operation is implemented in many operations in the Guest Kernel, such as translation lookaside buffers (TLB) shootdown, read-copy-update (RCU), CPU frequency scaling, and Schedule.

In an application scenario of the PV driver, a thread "Sender" used as an interrupt signal sender is in a Guest Kernel, and a thread "Receiver" used as an interrupt signal receiver is in a Host Kernel. The PV driver is divided into a front-end driver and a back-end driver. After completing request filling, the front-end driver needs to activate or wake up (kick) the back-end driver to work.

In an application scenario of the two-level scheduler, a thread "Sender" used as an interrupt signal sender is in a Guest Kernel or a Host Kernel, and a thread "Receiver" used as an interrupt signal receiver is in the Host Kernel. In a two-level scheduler system, in addition to an L1 scheduler (for example, a Linux CFS) in the Host Kernel, there is another scheduler (an L2 scheduler) in the Guest Kernel or HR3. The L2 scheduler is configured to schedule a task in the Guest Kernel or HR3. Regardless of a Work-Stealing or Work-Sharing model, when there are a lot of tasks, a new vCPU or thread needs to be waked up to work.

The following describes a method and an apparatus for sending an interrupt signal between a first thread and a second thread according to the implementations of the present specification in detail with reference to the accompanying drawings.

Figure 1:
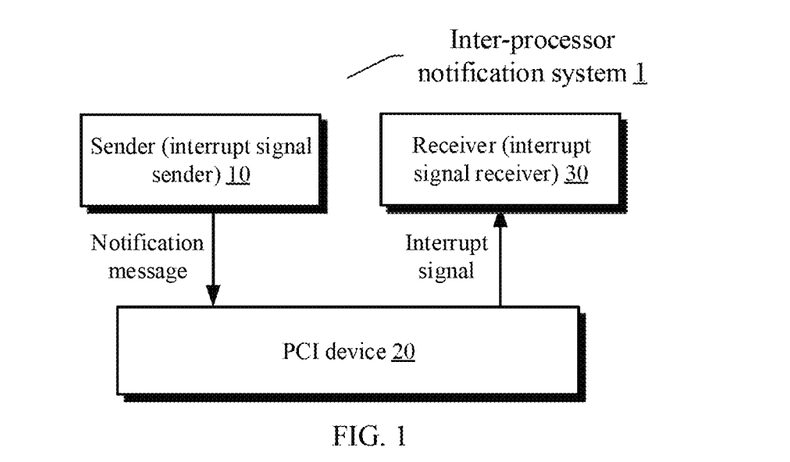
FIG. 1 is a block diagram illustrating an example of a system architecture of an inter-processor notification system according to an implementation of the present specification.

FIG. 1 is a block diagram illustrating an example of a system architecture of an inter-processor notification system 1 according to an implementation of the present specification.

As shown in FIG. 1, the inter-processor notification system 1 includes an interrupt signal sender "Sender" 10, a PCI device 20, and an interrupt signal receiver "Receiver" 30. The Sender 10 can be an HR3 thread running in a user mode, an HR0 thread run by a physical processor (for example, pCPU0) in a Host Kernel, or a Guest thread run by a virtual processor (for example, vCPU0) in a Guest Kernel. The Receiver 30 can be an HR3 thread running in the user mode, an HR0 thread run by a physical processor (for example, pCPU1) in the Host Kernel, or a Guest thread run by a virtual processor (for example, vCPU1) in the Guest Kernel.

Figure 2:
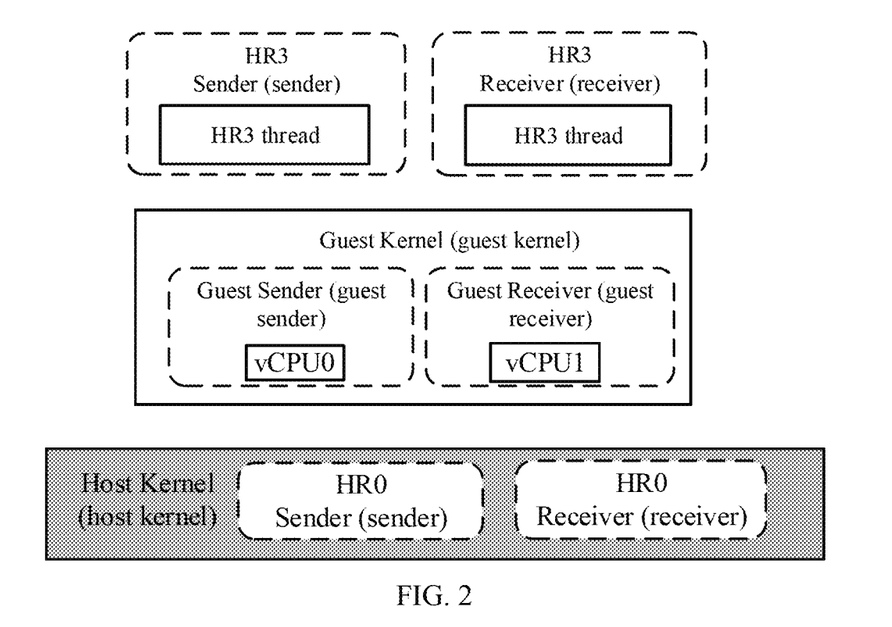
FIG. 2 is a schematic diagram illustrating deployment of an interrupt signal sender and an interrupt signal receiver according to an implementation of the present specification.

FIG. 2 is a schematic diagram illustrating deployment of an interrupt signal sender "Sender" and an interrupt signal receiver "Receiver" according to an implementation of the present specification. In the present specification, the Sender 10 and the Receiver 30 respectively correspond to a first thread and a second thread, for descriptive purposes only.

The PCI device 20 can be implemented, for example, by adding a customized notification distribution (notification distribution) function and/or a notification restrictor (notification restrictor) function to a general-purpose peripheral component interconnect (PCI) device. An example of the general-purpose PCI device can include, but is not limited to, a network interface controller (NIC) device, an application policy infrastructure controller (APIC) device, or an Intel dynamic load balancer (DLB) device. An example of the NIC device can include but is not limited to a general-purpose network adapter device such as ixgbe or i40e, or an intelligent network adapter device.

Before inter-processor notification is performed, initialization processing needs to be performed on the Sender 10 and the Receiver 30. In response to that initialization processing is performed on the Sender 10, a memory address of the PCI device 20 is mapped to a virtual space address of the Sender 10.

Figure 3:
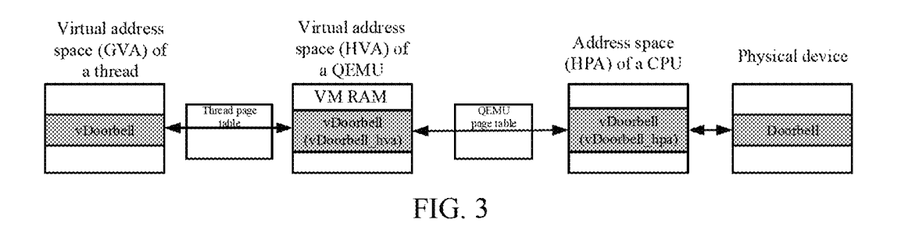
FIG. 3 is a schematic diagram illustrating an example of an initialization process of an interrupt signal sender according to an implementation of the present specification.

FIG. 3 is a schematic diagram illustrating an example of an initialization process of an interrupt signal sender according to an implementation of the present specification.

In a HOST scenario, a thread usually accesses the PCI device 20 (for example, an RNIC) by using a memory mapped I/O (MMIO) write operation. To enable a thread in a virtual machine (VM) scenario to also access the PCI device 20 in the above method, additional memory mapping needs to be introduced, that is, a memory address of an MMIO memory (for example, a Doorbell memory) of the PCI device 20 is mapped to virtual address space of the thread in a VM. The following describes the above process by using an example in which a Doorbell memory is mapped in a device initialization process.

A front-end thread invokes a Verbs interface "open_device" to initialize a device context. The initialization invocation is divided into three parts shown in FIG. 3: steps 2a, 2b, and 2c.

As shown in FIG. 3, in step 2a, after receiving a front-end request, a virtualization back end applies for a Doorbell memory in an RNIC. Therefore, a back-end driver obtains a HOST physical address (HPA) doorbell_hpa of the applied Doorbell memory. In step 2b, a front-end driver identifies an MMIO memory in which the Doorbell memory of the PCI device is located, and then invokes mmap( ) to map a memory address of the MMIO memory to a virtual address space of the thread. The applied memory can be referred to as vDoorbell, and corresponds to virtual address space doorbell_hva in a QEMU. In step 2c, the back-end driver creates a mapping between doorbell_hva and doorbell_hpa by modifying a QEMU page table. Therefore, the front-end thread is directed to a real Doorbell memory in the PCI device when accessing vDoorbell. In this method, a thread in a VM can directly access a Doorbell memory in the PCI device by using an MMIO write operation.

When the Receiver 30 is initialized, interrupt configuration information of the PCI device is configured based on status information of the Receiver 30. In the present specification, status information of a thread can include a running status of the thread and whether the thread is running. The interrupt configuration information can include an interrupt signal sending manner and a target CPU.

Figure 4:
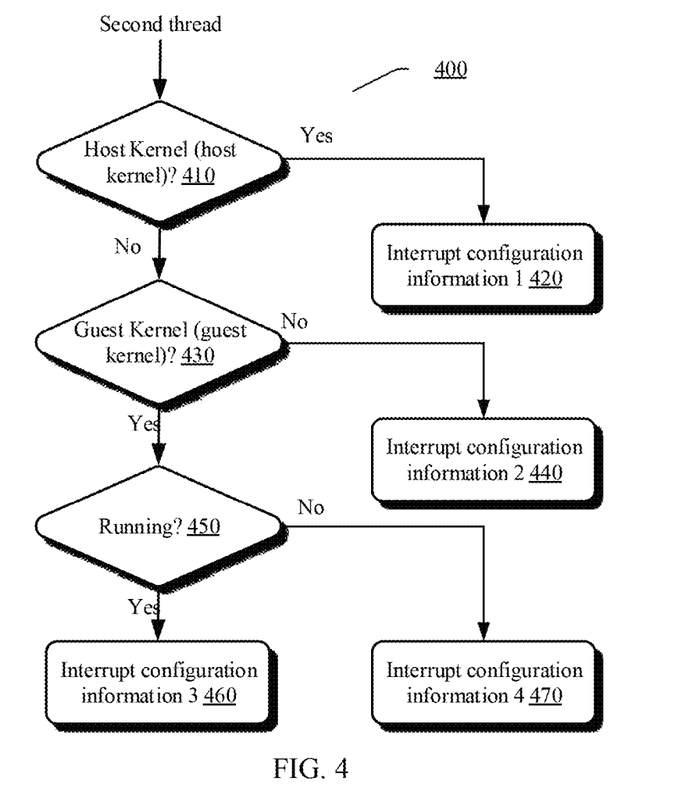
FIG. 4 is a flowchart illustrating an example of an interrupt configuration information configuration process according to an implementation of the present specification.

FIG. 4 is a flowchart illustrating an example of a process 400 for configuring interrupt configuration information according to an implementation of the present specification.

As shown in FIG. 4, when the Receiver 30 is initialized, in step 410, it is determined whether the Receiver 30 is in a Host Kernel. If it is determined that the Receiver 30 is in the Host Kernel, in step 420, the interrupt configuration information of the PCI device 20 is configured as interrupt configuration information 1, that is, the interrupt signal sending manner in the interrupt configuration information is configured as sending an interrupt signal to an interrupt handler Interrupt Handler configured for the Receiver 30 in a processor in which the Receiver 30 is located. For example, when the Receiver 30 is in the Host Kernel, an appropriate Interrupt Handler can be configured for the Receiver 30 in the Host Kernel. Then, the interrupt signal is sent to the configured Interrupt Handler. The Interrupt Handler performs corresponding processing in response to the received interrupt signal. In the present specification, the term "processor in which a thread is located" is a processor that runs the thread. An example of the processor can include but is not limited to a CPU, an MPU, a GPU, or the like.

If it is determined that the Receiver 30 is not in the Host Kernel, in step 430, it is determined whether the Receiver 30 is in a Guest Kernel. If it is determined that the Receiver 30 is not in the Guest Kernel (is in a user mode and is an HR3 thread), in step 440, the interrupt configuration information of the PCI device 20 is configured as interrupt configuration information 2, that is, the interrupt signal sending manner in the interrupt configuration information is configured as sending the interrupt signal to the processor in which the Receiver 30 is located. In an example, the interrupt signal sending manner can be configured as sending the interrupt signal to the processor in which the Receiver 30 is located by using a semaphore (semaphore) sending mechanism or an eventfd sending mechanism.

The semaphore sending mechanism processes a semaphore by using two standard atomic operations—P and V operations (PV operation). A data structure of the semaphore is a value and a pointer, and the pointer points to a next process waiting for the semaphore. The value of the semaphore is related to usage of a corresponding resource. When the value of the semaphore is greater than 0, the value of the semaphore indicates the number of currently available resources. When the value of the semaphore is less than 0, an absolute value of the value of the semaphore indicates the number of processes waiting to use the resource. The value of the semaphore is changed by using a PV operation. Performing a P operation means requesting to allocate one unit resource, where 1 is subtracted from the value of the semaphore. Performing a V operation means releasing one unit resource, where 1 is added to the value of the semaphore.

The PV operation includes a P operation primitive and a V operation primitive. In the P operation (wait), a unit resource is applied for, and a process enters the unit resource. In the V operation (signal), a unit resource is released, and a process is exited from the unit resource. After a P(S) operation is performed, 1 is subtracted from the value of the semaphore S, that is, S=S−1. If S≤0, the process continues to be executed. Otherwise, the process is set to a waiting state and placed in a waiting queue. After a V(S) operation is performed, 1 is added to the value of the semaphore S, that is, S=S+1. If S>0, the process continues to be executed. Otherwise, the first process waiting for the semaphore in the queue is released.

If it is determined that the Receiver 30 is in the Guest Kernel, in step 450, it is determined whether the Receiver 30 is running. If it is determined that the Receiver 30 is running, in step 460, the interrupt configuration information of the PCI device 20 is configured as interrupt configuration information 3, that is, an interrupt is configured as a Posted Interrupt, and the interrupt signal sending manner in the interrupt configuration information is configured as sending the interrupt signal to the processor in which the Receiver 30 is located. The Posted Interrupt allows an APIC interrupt to be directly injected into a guest without requiring VM-Exit.

If it is determined that the Receiver 30 is not running, in step 470, the interrupt configuration information of the PCI device 20 is configured as interrupt configuration information 4, that is, the interrupt signal sending manner in the interrupt configuration information is configured as sending the interrupt signal to a physical processor corresponding to a virtual processor in which the Receiver 30 is located in the Host Kernel, and the physical processor is configured to wake up the virtual processor in which the Receiver 30 is located. For example, the physical processor can bind and wake up the virtual processor in which the Receiver 30 is located by using irqfd. If necessary, the interrupt signal can be injected into the Guest Kernel, and an IRQ response in the Guest Kernel can be adjusted as applicable in various implementation scenarios.

Figure 5:
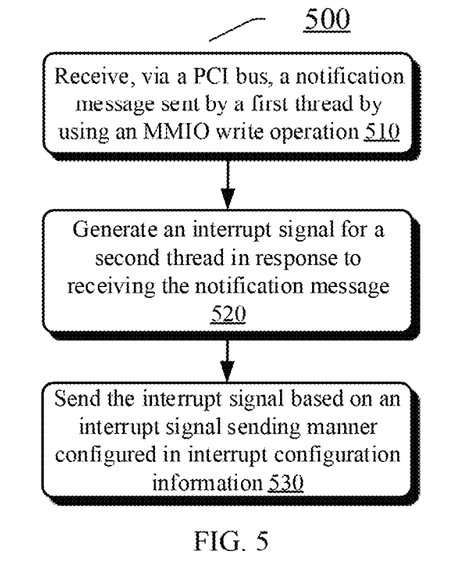
FIG. 5 is a flowchart illustrating a method for sending an interrupt signal between a first thread and a second thread according to an implementation of the present specification.

FIG. 5 is a flowchart illustrating a method 500 for sending an interrupt signal between a first thread and a second thread according to an implementation of the present specification. The method 500 is performed by the PCI device 20.

As shown in FIG. 5, in step 510, the PCI device 20 receives, via a PCI bus, a notification message sent by a processor in which a first thread is located by using an MMIO write operation. Herein, the MMIO write operation is implemented based on a virtual space address of the Sender 10 to which a memory address of an MMIO memory of the PCI device is mapped. Herein, the MMIO memory can include, for example, a Doorbell memory. In an example, the notification message can be a mov instruction. A source operand of the mov instruction stores a target value of the MMIO memory of the PCI device 20, and a destination address of the mov instruction is the virtual space address of the Sender 10 to which the MMIO memory is mapped. For example, the mov instruction can be mov reg, mem, where a reg register stores the target value of the Doorbell memory, and mem represents the virtual space address of the Sender 10 to which the Doorbell memory is mapped.

In step 520, the PCI device 20 generates an interrupt signal for the Receiver 30 in response to receiving the notification message. Herein, the interrupt signal for the Receiver 30 means that the generated interrupt signal is intended to go to a processor in which the Receiver 30 is located.

In an example, the target value of the MMIO memory stored in the source operand can include a fixed value. Correspondingly, after receiving the notification message, the PCI device 20 generates an interrupt signal of a fixed type. In another example, the target value of the MMIO memory stored in the source operand can include one of a plurality of values, and each value of the plurality of values corresponds to a type of an interrupt signal. Correspondingly, the interrupt signal corresponding to the target value is generated based on the target value of the MMIO memory in the mov instruction in response to receiving the mov instruction.

After the interrupt signal is generated as described above, in step 530, the interrupt signal is sent to the processor in which the Receiver 30 is located based on an interrupt signal sending manner configured in interrupt configuration information of the PCI device. After receiving the interrupt signal, the processor in which the Receiver 30 is located performs corresponding processing in response to the received interrupt signal.

In an example, the PCI device 20 can have a restriction policy. An example of the restriction policy can include, but is not limited to, a highest number of times the PCI device 20 sends an interrupt signal within a specified time period. For example, the PCI device 20 sends an interrupt signal for a highest number of M times for each interrupt in one second. A reason for introducing the restriction policy is to prevent an untrusted user from performing a DOS attack by using this interrupt sending mechanism. In the above restriction policy, a counter "Counter" needs to be set for each interrupt signal in the PCI device 20, and the number of times of sending the interrupt signal within a specified time period is counted by using the counter Counter.

When the PCI device 20 has the restriction policy, after the interrupt signal is generated, restriction determining can be performed based on the restriction policy, to determine whether restriction processing needs to be performed on the interrupt signal. For example, when the number of times of sending the interrupt signal within a specified time period reaches the highest number of sending times, it is determined that restriction processing needs to be performed on the interrupt signal. When the number of times of sending the interrupt signal within the specified time period does not reach the highest number of sending times, it is determined that restriction processing does not need to be performed on the interrupt signal. In response to a result of the restriction determining is that restriction is required, the interrupt signal is not sent. In response to a result of the restriction determining is that no restriction is required, the interrupt signal is sent to the processor in which the Receiver 30 is located based on the interrupt signal sending manner configured in the interrupt configuration information of the PCI device.

In an example, the PCI device 20 can have a distribution policy. An example of the distribution policy can include, but is not limited to, a broadcast distribution mode, a semaphore distribution mode, a 1:1 directional distribution mode, or a 1:N directional distribution mode. In the 1:N directional distribution mode, the PCI device 20 generates N interrupt signals respectively for N Receivers 30 in response to receiving the notification message.

When the PCI device 20 has the distribution policy, the PCI device 20 sends the generated interrupt signal to the processor in which the Receiver 30 is located based on the interrupt signal sending manner configured in the interrupt configuration information of the PCI device 20 according to the distribution policy.

In an example, the PCI device 20 can have an interrupt remapping table. In this case, after generating the interrupt signal, the PCI device 20 performs interrupt remapping on the interrupt signal based on the interrupt remapping table, to obtain an interrupt signal obtained after the interrupt remapping. Then, the PCI device 20 sends the interrupt signal obtained after the interrupt remapping to the processor in which the Receiver 30 is located based on the interrupt signal sending manner configured in the interrupt configuration information of the PCI device 20.

In some implementations, the restriction policy and the distribution policy can be generated based on a specific application scenario and delivered to the PCI device 20.

In the interrupt signal sending solution according to this implementation of the present specification, the MMIO write operation is performed by a processor in which the Sender 10 is located, and the Sender 10 can continue to perform another function by using an out-of-order (out-of-order) execution function of the processor (CPU). In this processing method, for the Sender 10, an operation of "initiating an interrupt notification (kick)" by the Sender 10 does not prevent the Sender 10 from executing subsequent code, so that overheads of the interrupt notification at the Sender 10 are extremely small.

In addition, because a trigger condition of the kick operation of the Sender 10 is only the MMIO write (Doorbell) operation implemented based on the memory address of the PCI device 20, the Sender 10 can run in any running state, for example, HR3/HR0 shown in FIG. 2, or GR3/GR0, provided that the Sender 10 can access the memory address of the PCI device 20.

Furthermore, in the interrupt signal sending solution according to this implementation of the present specification, an entire delay mainly relates to data transmission on the PCI bus, so that an interrupt signal sending delay can be effectively reduced. In addition, in the interrupt signal sending solution according to this implementation of the present specification, the restriction policy is set in the PCI device 20, so that a DOS attack can be effectively prevented.

Figure 6:
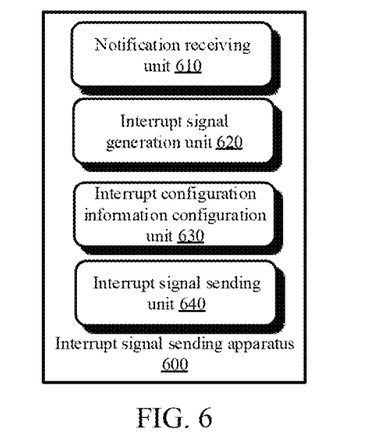
FIG. 6 is a block diagram illustrating an apparatus for sending an interrupt signal between a first thread and a second thread according to an implementation of the present specification.

FIG. 6 is a block diagram illustrating an apparatus (hereinafter referred to as an "interrupt signal sending apparatus") 600 for sending an interrupt signal between a first thread and a second thread according to an implementation of the present specification. As shown in FIG. 6, the interrupt signal sending apparatus 600 includes a notification receiving unit 610, an interrupt signal generation unit 620, an interrupt configuration information configuration unit 630, and an interrupt signal sending unit 640.

The notification receiving unit 610 is configured to receive, via a PCI bus, a notification message sent by a processor in which a first thread is located by using an MMIO write operation, where the MMIO write operation is implemented based on a virtual space address of the first thread to which a memory address of an MMIO memory of the PCI device is mapped. For an operation of the notification receiving unit 610, refer to the operation described above with reference to step 510 in FIG. 5.

The interrupt signal generation unit 620 is configured to generate an interrupt signal for a second thread in response to receiving the notification message. For an operation of the interrupt signal generation unit 620, refer to the operation described above with reference to step 520 in FIG. 5.

The interrupt configuration information configuration unit 630 is configured to configure interrupt configuration information of the PCI device based on status information of the second thread. The status information of the second thread can include whether the second thread is running or a running status of the second thread.

The interrupt signal sending unit 640 is configured to send the interrupt signal to a processor in which the second thread is located based on an interrupt signal sending manner configured in the interrupt configuration information of the PCI device.

In an example, the interrupt configuration information configuration unit 630 is configured to configure the interrupt signal sending manner as sending the interrupt signal to an Interrupt Handler configured for the second thread in the processor in which the second thread is located based on the second thread is in a Host Kernel. The interrupt configuration information configuration unit 630 is configured to configure an interrupt as a Posted Interrupt, and configure the interrupt signal sending manner as sending the interrupt signal to the processor in which the second thread is located based on the second thread is in a Guest Kernel and the second thread is running. The interrupt configuration information configuration unit 630 is configured to configure the interrupt signal sending manner as sending the interrupt signal to a physical processor corresponding to a virtual processor in which the second thread is located in the Host Kernel based on the second thread is in the Guest Kernel and the second thread is not running, where the physical processor is configured to wake up the virtual processor in which the second thread is located. The interrupt configuration information configuration unit 630 is configured to configure the interrupt signal sending manner as sending the interrupt signal to the processor in which the second thread is located based on the second thread is in a user mode.

In addition, in an example, the interrupt configuration information configuration unit 630 is configured to configure the interrupt signal sending manner as sending the interrupt signal to the processor in which the second thread is located by using a semaphore sending mechanism or an eventfd sending mechanism based on the second thread is in the user mode.

In addition, in an example, the notification message can include a mov instruction, a source operand of the mov instruction stores a target value of the MMIO memory of the PCI device, and a destination address of the mov instruction is the virtual space address of the first thread to which the MMIO memory is mapped.

In an example, the target value of the MMIO memory stored in the source operand can include a fixed value. Correspondingly, the interrupt signal generation unit 620 generates an interrupt signal of a fixed type after the notification message is received. In another example, the target value of the MMIO memory stored in the source operand can include one of a plurality of values, and each value of the plurality of values corresponds to a type of an interrupt signal. Correspondingly, the interrupt signal generation unit 620 is configured to generate the interrupt signal corresponding to the target value based on the target value of the MMIO memory in the mov instruction after the mov instruction is received.

In an example, the PCI device can have a restriction policy. The interrupt signal sending apparatus 600 can further include a restriction determining unit (not shown). The restriction determining unit is configured to perform restriction determining according to the restriction policy after the interrupt signal is generated. The interrupt signal sending unit 640 does not send the interrupt signal in response to that the restriction determining unit determines that restriction is to be performed. The interrupt signal sending unit 640 sends the interrupt signal to the processor in which the second thread is located based on the interrupt signal sending manner configured in the interrupt configuration information of the PCI device in response to that the restriction determining unit determines that restriction is not to be performed.

In an example, the PCI device has a distribution policy. In this case, the interrupt signal sending unit 640 is configured to send the interrupt signal to the processor in which the second thread is located based on the interrupt signal sending manner configured in the interrupt configuration information of the PCI device according to the distribution policy.

In an example, the PCI device can have an interrupt remapping table. The interrupt signal sending apparatus can further include an interrupt remapping unit (not shown). The interrupt remapping unit is configured to perform interrupt remapping on the interrupt signal based on the interrupt remapping table. Then, the interrupt signal sending unit 640 is configured to send an interrupt signal obtained after the interrupt remapping to the processor in which the second thread is located based on the interrupt signal sending manner configured in the interrupt configuration information of the PCI device.

The interrupt signal sending manner and the interrupt signal sending apparatus according to the implementations of the present specification are described above with reference to FIG. 1 to FIG. 6. The above interrupt signal sending apparatus can be implemented by using hardware, or can be implemented by using software or a combination of hardware and software.

Figure 7:
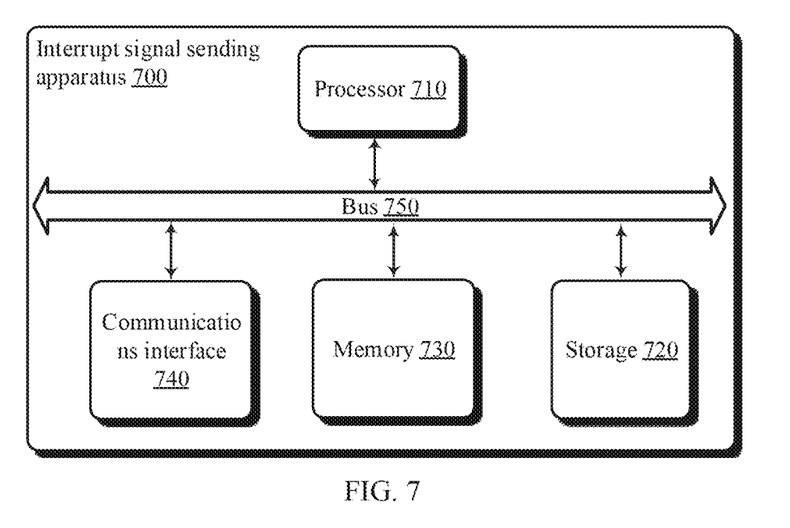
FIG. 7 is a schematic diagram illustrating an interrupt signal sending apparatus implemented based on a computer according to an implementation of the present specification.

FIG. 7 is a schematic diagram illustrating an interrupt signal sending apparatus 700 implemented based on a computer according to an implementation of the present specification. As shown in FIG. 7, the interrupt signal sending apparatus 700 can include at least one processor 710, a storage (for example, a non-volatile memory) 720, a memory 730, and a communications interface 740, and the at least one processor 710, the storage 720, the memory 730, and the communications interface 740 are connected together by using a bus 750. The at least one processor 710 executes a computer program (the above elements implemented in a software form) stored or encoded in the storage.

In an implementation, a computer program is stored in the storage, and when the computer program is executed, the at least one processor 710 is caused to receive, via a PCI bus, a notification message sent by a processor in which a first thread is located by using an MMIO write operation, where the MMIO write operation is implemented based on a virtual space address of the first thread to which a memory address of an MMIO memory of a PCI device is mapped; generate an interrupt signal for a second thread in response to receiving the notification message; and send the interrupt signal to a processor in which the second thread is located based on an interrupt signal sending manner configured in interrupt configuration information of the PCI device, where the interrupt configuration information is configured based on status information of the second thread, and the status information of the second thread includes whether the second thread is running or a running status of the second thread.

It should be understood that when the computer program stored in the storage is executed, the at least one processor 710 is caused to perform various operations and functions described with reference to FIG. 1 to FIG. 6 in the implementations of the present specification.

According to an implementation, a program product such as a computer-readable medium (for example, a non-temporary computer-readable medium) is provided. The computer-readable medium can have a computer program (the above elements implemented in a software form). When the computer program is executed by a (one or more) processor, the (one or more) processor is caused to (individually or collectively) perform various operations and functions described with reference to FIG. 1 to FIG. 6 in the implementations of the present specification. Specifically, a system or an apparatus configured with a readable storage medium can be provided. Software program code implementing the functions in any one of the above implementations is stored in the readable storage medium, and a computer or a processor of the system or the apparatus is caused to read and execute the computer program stored in the readable storage medium.

In this case, the program code read from the readable medium can implement the functions of any one of the above implementations, and therefore the computer-readable code and the readable storage medium storing the computer-readable code constitute a part of the present specification.

An implementation of the readable storage medium includes a floppy disk, a hard disk, a magneto-optical disk, an optical disk (for example, a CD-ROM, a CD-R, a CD-RW, a DVD-ROM, a DVD-RAM, or a DVD-RW), a magnetic tape, a non-volatile memory card, or a ROM. In some implementations, the program code can be downloaded from a server computer or from the cloud by using a communication network.

According to an implementation, a computer program product is provided. The computer program product includes a computer program, and when the computer program is executed by a processor, the processor is caused to perform various operations and functions described above with reference to FIG. 1 to FIG. 6 in the implementations of the present specification.

It should be understood by a person skilled in the art that various changes and modifications can be made to the implementations disclosed above without departing from the spirit of the present invention.

It should be noted that not all the steps and units in the above processes and system block diagrams are mandatory, and some steps or units can be ignored. An execution sequence of the steps is not fixed, and can be determined dynamically or vary with different implementation scenarios. The apparatus structures described in the above implementations can be physical structures or logical structures. That is, some units may be implemented by the same physical entity, or some units may be respectively implemented by a plurality of physical entities or may be jointly implemented by some components in a plurality of independent devices.

In the above implementations, the hardware units or modules can be implemented mechanically or electrically. For example, a hardware unit, module, or processor can include dedicated permanent circuitry or logic (for example, a dedicated processor, an FPGA, or an ASIC) for performing a corresponding operation. The hardware unit or processor can further include programmable logic or circuitry (for example, a general-purpose processor or another programmable processor), and can be temporarily arranged by software to perform a corresponding operation. A specific implementation (a mechanical method, a dedicated permanent circuitry, or a temporarily arranged circuitry) can be determined based on costs and time considerations.

A processor may be a physical processing unit or a virtual processor (a processor level virtual machine). Multiple processors may collectively perform implementations of the specification through a distributed computing environment. A storage device may be a physical storage device or a virtual storage device. For example, in virtual storage environment, multiple physical disks can be pooled into a cluster. The data stored in the virtual, software-based storage cluster can be accessed based on the cloud. The actual storage may span across several physical servers in one or more datacenters owned by a cloud service provider.

Example implementations are described in the specific implementations described above with reference to the accompanying drawings, but do not represent all implementations that can be practiced or fall within the scope of the specification. The term "for example" used throughout the present specification means "being used as an example, an instance, or an illustration", and does not mean "being more preferred" or "being more advantageous" than other implementations. Specific implementations include specific details for the purpose of providing an understanding of the described technologies. However, these technologies can be practiced without these specific details. In some instances, well-known structures and apparatuses are shown in a form of block diagrams to avoid obscuring the concepts of the described implementations.

The above descriptions of the content of the present disclosure are provided to cause any person of ordinary skill in the art to implement or use the content of the present disclosure. Various modifications to the content of the present disclosure are apparent to a person of ordinary skill in the art, and the general principles described herein can be applied to other variations without departing from the protection scope of the content of the present disclosure. Therefore, the content of the present disclosure is not limited to the examples and designs described herein, but is consistent with the widest scope in accordance with the principles and novel features disclosed herein.

What is claimed is:

1. A method for sending an interrupt signal between a first thread and a second thread, the method being executed by a peripheral component interconnect (PCI) device and comprising:
   receiving, via a PCI bus, a notification message from a first processor in which a first thread is located, the notification message related to a virtual space address of the first thread to which a memory address of a memory mapped I/O (MMIO) memory of the PCI device is mapped;
   generating an interrupt signal for a second thread in response to receiving the notification message;
   configuring interrupt configuration information of the PCI device based on status information of the second thread that includes whether the second thread is running or a running status of the second thread, the configuring the interrupt configuration information including configuring an interrupt signal sending mechanism as sending the interrupt signal to a physical processor in a host kernel corresponding to a second processor in which the second thread is located in response to the second thread being assigned in a guest kernel and the second thread being not running and the second processor being a virtual processor, the physical processor being configured to wake up the virtual processor; and
   sending the interrupt signal to the second processor in which the second thread is located based on the interrupt configuration information of the PCI device.

2. The method according to claim 1, wherein the configuring the interrupt configuration information includes:
   configuring the interrupt signal sending mechanism as sending the interrupt signal to an interrupt handler configured for the second thread in response to the second thread being assigned in the host kernel;
   configuring an interrupt as a posted interrupt, and configuring the interrupt signal sending mechanism as sending the interrupt signal to the second processor in which the second thread is located in response to the second thread being assigned in the guest kernel and the second thread being running; and
   configuring the interrupt signal sending mechanism as sending the interrupt signal to the second processor in which the second thread is located in response to the second thread being in a user mode.

3. The method according to claim 2, wherein the configuring the interrupt signal sending mechanism as sending the interrupt signal to the second processor in which the second thread is located in response to the second thread being in the user mode includes:
   configuring the interrupt signal sending mechanism as sending the interrupt signal to the second processor in which the second thread is located by using a semaphore sending mechanism or an eventfd sending mechanism.

4. The method according to claim 1, wherein the notification message includes an mov instruction, a source operand of the mov instruction stores a target value of the MMIO memory of the PCI device, and a destination address of the mov instruction is the virtual space address of the first thread to which the MMIO memory is mapped.

5. The method according to claim 4, wherein the target value of the MMIO memory includes one of a plurality of values, and each value of the plurality of values corresponds to a type of an interrupt signal; and
   wherein the generating the interrupt signal in response to receiving the notification message includes:
   generating the interrupt signal based on the target value of the MMIO memory included in the mov instruction.

6. The method according to claim 1, wherein the MMIO memory includes a doorbell memory.

7. The method according to claim 1, wherein the PCI device has a restriction policy, and the method further comprises:
   performing restriction determining according to the restriction policy after generating the interrupt signal, wherein:
   the interrupt signal is not sent in response to a result of the restriction determining is that restriction is to be performed; and
   the interrupt signal is sent to the second processor in which the second thread is located in response to a result of the restriction determining is that restriction is not to be performed.

8. The method according to claim 1, wherein the PCI device has a distribution policy, and the sending the interrupt signal to the second processor in which the second thread is located based on the interrupt configuration information of the PCI device includes:
   sending the interrupt signal to the second processor in which the second thread is located based on the interrupt configuration information of the PCI device according to the distribution policy in the PCI device.

9. The method according to claim 1, wherein the PCI device has an interrupt remapping table, and the method further comprises:
   performing interrupt remapping on the interrupt signal based on the interrupt remapping table; and
   wherein the sending the interrupt signal to the second processor in which the second thread is located based on the interrupt configuration information of the PCI device includes:
   sending an interrupt signal obtained after the interrupt remapping to the second processor in which the second thread is located.

10. The method of claim 1, wherein the notification message is sent by the first processor in which the first thread is located using an MIMO write operation based on the virtual space address of the first thread.

11. A computing device having one or more processing units and one or more storage devices, the one or more storage devices individually or collectively storing computer executable instructions, which when executed by the one or more processing units, enable the one or more processing units to individually or collectively implement acts comprising:
   receiving, via a peripheral component interconnect (PCI) bus, a notification message from a first processor in which a first thread is located, the notification message related to a virtual space address of the first thread to which a memory address of a memory mapped I/O (MMIO) memory of a PCI device is mapped;
   generating an interrupt signal for a second thread in response to receiving the notification message;
   configuring interrupt configuration information of the PCI device based on status information of the second thread that includes whether the second thread is running or a running status of the second thread, the configuring the interrupt configuration information including configuring an interrupt signal sending mechanism as sending the interrupt signal to a physical processor in a host kernel corresponding to a second processor in which the second thread is located in response to the second thread being assigned in a guest kernel and the second thread being not running and the second processor being a virtual processor, the physical processor being configured to wake up the virtual processor; and sending the interrupt signal to the second processor in which the second thread is located based on the interrupt configuration information of the PCI device.

12. The computing device according to claim 11, wherein the configuring the interrupt configuration information includes:

configuring the interrupt signal sending mechanism as sending the interrupt signal to an interrupt handler configured for the second thread in response to the second thread being assigned in the host kernel;

configuring an interrupt as a posted interrupt, and configuring the interrupt signal sending mechanism as sending the interrupt signal to the second processor in which the second thread is located in response to the second thread being assigned in the guest kernel and the second thread being running; and configuring the interrupt signal sending mechanism as sending the interrupt signal to the second processor in which the second thread is located in response to the second thread being in a user mode.

13. The computing device according to claim 12, wherein the configuring the interrupt signal sending mechanism as sending the interrupt signal to the second processor in which the second thread is located in response to the second thread being in the user mode includes:

configuring the interrupt signal sending mechanism as sending the interrupt signal to the second processor in which the second thread is located by using a semaphore sending mechanism or an eventfd sending mechanism.

14. The computing device according to claim 11, wherein the notification message includes an mov instruction, a source operand of the mov instruction stores a target value of the MMIO memory of the PCI device, and a destination address of the mov instruction is the virtual space address of the first thread to which the MMIO memory is mapped.

15. The computing device according to claim 14, wherein the target value of the MMIO memory includes one of a plurality of values, and each value of the plurality of values corresponds to a type of an interrupt signal; and wherein the generating the interrupt signal in response to receiving the notification message includes:

generating the interrupt signal based on the target value of the MMIO memory included in the mov instruction.

16. The computing device according to claim 11, wherein the MMIO memory includes a doorbell memory.

17. The computing device according to claim 11, wherein the executable instructions include a restriction policy, and the acts further comprise:

performing restriction determining according to the restriction policy after generating the interrupt signal, wherein:

the interrupt signal is not sent in response to a result of the restriction determining is that restriction is to be performed; and the interrupt signal is sent to the second processor in which the second thread is located in response to a result of the restriction determining is that restriction is not to be performed.

18. The computing device according to claim 11, wherein the executable instructions include a distribution policy, and the sending the interrupt signal to the second processor in which the second thread is located based on the interrupt configuration information of the PCI device includes:

sending the interrupt signal to the second processor in which the second thread is located based on the interrupt configuration information of the PCI device according to the distribution policy in the PCI device.

19. A non-transitory computer storage medium having computer executable instructions stored thereon, which when executed by one or more processing units, enable the one or more processing units to individually or collectively implement acts comprising:

receiving, via a peripheral component interconnect (PCI) bus, a notification message from a first processor in which a first thread is located, the notification message related to a virtual space address of the first thread to which a memory address of a memory mapped I/O (MMIO) memory of a PCI device is mapped;

generating an interrupt signal for a second thread in response to receiving the notification message;

configuring interrupt configuration information of the PCI device based on status information of the second thread that includes whether the second thread is running or a running status of the second thread, the configuring the interrupt configuration information including configuring an interrupt signal sending mechanism as sending the interrupt signal to a physical processor in a host kernel corresponding to a second processor in which the second thread is located in response to the second thread being assigned in a guest kernel and the second thread being not running and the second processor being a virtual processor, the physical processor being configured to wake up the virtual processor; and sending the interrupt signal to the second processor in which the second thread is located based on the interrupt configuration information of the PCI device.

20. The non-transitory computer storage medium according to claim 19, wherein the configuring the interrupt configuration information includes:

configuring the interrupt signal sending mechanism as sending the interrupt signal to an interrupt handler configured for the second thread in response to the second thread being assigned in the host kernel;

configuring an interrupt as a posted interrupt, and configuring the interrupt signal sending mechanism as sending the interrupt signal to the second processor in which the second thread is located in response to the second thread being assigned in the guest kernel and the second thread being running; and configuring the interrupt signal sending mechanism as sending the interrupt signal to the second processor in which the second thread is located in response to the second thread being in a user mode.

* * * * *